(12) United States Patent
Moyer

(10) Patent No.: US 12,026,099 B2
(45) Date of Patent: Jul. 2, 2024

(54) SYSTEM AND METHOD FOR STORING CACHE LOCATION INFORMATION FOR CACHE ENTRY TRANSFER

(71) Applicant: ADVANCED MICRO DEVICES, INC., Santa Clara, CA (US)

(72) Inventor: Paul James Moyer, Fort Collins, CO (US)

(73) Assignee: Advanced Micro Devices, Inc., Santa Clara, CA (US)

(*) Notice: Subject to any disclaimer, the term of this patent is extended or adjusted under 35 U.S.C. 154(b) by 0 days.

(21) Appl. No.: 17/181,879

(22) Filed: Feb. 22, 2021

(65) Prior Publication Data
US 2021/0173789 A1 Jun. 10, 2021

Related U.S. Application Data

(63) Continuation of application No. 15/210,846, filed on Jul. 14, 2016, now Pat. No. 10,956,339.

(51) Int. Cl.
*G06F 12/0895* (2016.01)
*G06F 12/0804* (2016.01)
(Continued)

(52) U.S. Cl.
CPC ...... *G06F 12/0895* (2013.01); *G06F 12/0804* (2013.01); *G06F 12/0866* (2013.01);
(Continued)

(58) Field of Classification Search
CPC ............ G06F 12/0804; G06F 12/0866; G06F 12/0895; G06F 12/0897; G06F 2212/1016;
(Continued)

(56) References Cited

U.S. PATENT DOCUMENTS 6,321,297 B1 * 11/2001 Shamanna .......... G06F 12/0897
710/52
2007/0239938 A1 * 10/2007 Pong .................. G06F 12/0895
711/E12.043
(Continued)

FOREIGN PATENT DOCUMENTS

CN    1940892    4/2007
CN    104346294  2/2015
(Continued)

OTHER PUBLICATIONS

Japanese Office Action dated Jul. 6, 2021 issued in Application No. 2019-501642, 16 pages.
(Continued)

*Primary Examiner* — Jane W Benner

(57) ABSTRACT

A cache stores, along with data that is being transferred from a higher level cache to a lower level cache, information indicating the higher level cache location from which the data was transferred. Upon receiving a request for data that is stored at the location in the higher level cache, a cache controller stores the higher level cache location information in a status tag of the data. The cache controller then transfers the data with the status tag indicating the higher level cache location to a lower level cache. When the data is subsequently updated or evicted from the lower level cache, the cache controller reads the status tag location information and transfers the data back to the location in the higher level cache from which it was originally transferred.

19 Claims, 4 Drawing Sheets

(51) Int. Cl.
*G06F 12/0815* (2016.01)
*G06F 12/0866* (2016.01)
*G06F 12/0897* (2016.01)

(52) U.S. Cl.
CPC ...... *G06F 12/0897* (2013.01); *G06F 12/0815* (2013.01); *G06F 2212/1016* (2013.01); *G06F 2212/1028* (2013.01)

(58) Field of Classification Search
CPC ......... G06F 2212/1028; G06F 12/0811; G06F 12/128; G06F 12/0815
See application file for complete search history.

(56) References Cited

U.S. PATENT DOCUMENTS

| | | |
|---|---|---|
| 2012/0173825 A1 | 7/2012 | Ehrlich et al. |
| 2014/0156931 A1 | 6/2014 | Krick |
| 2015/0143046 A1 | 5/2015 | Hagersten et al. |
| 2015/0143047 A1 | 5/2015 | Hagersten et al. |
| 2015/0347297 A1 | 12/2015 | Hagersten et al. |

FOREIGN PATENT DOCUMENTS

| | | |
|---|---|---|
| EP | 0657819 | 6/1995 |
| JP | 2005-509204 | 4/2005 |
| JP | 2005-509204 A | 4/2005 |
| JP | 2008-040982 | 2/2008 |
| JP | 2008-040982 A | 2/2008 |

OTHER PUBLICATIONS

Indian Office Action dated Aug. 15, 2021 for Indian Application No. 201917001015, 6 pages.
Translation of Japanese Office Action dated Feb. 22, 2022 for Japanese Application No. 2019-501642, 11 pages.
Translation of Office Action dated Jan. 11, 2022 for Korean Application No. 10-2019-7002814, 14 pages.
Office Action dated Apr. 22, 2021 for European Patent Application No. 17828472.5. 11 pages.
Korean Office Action issued in Application No. 10-2019-7002814 dated Jun. 29, 2022, 9 pages.
Office Action issued in Korean Application 10-2019-7002814 dated Dec. 5, 2022. 11 pages.
Office Action issued in Chinese Application No. 201780043666.7 dated Nov. 3, 2022, 8 pages.
Office Action issued in Chinese Application No. 201780043666.7 dated Sep. 8, 2023, 13 pages.
Office Action issued in Korean Application No. 10-2023-7011379, dated Jun. 21, 2023, 13 pages.

* cited by examiner

SYSTEM AND METHOD FOR STORING CACHE LOCATION INFORMATION FOR CACHE ENTRY TRANSFER

CROSS-REFERENCE TO RELATED APPLICATIONS

The present application is a continuation application of U.S. patent application Ser. No. 15/210,846, entitled "SYSTEM AND METHOD FOR STORING CACHE LOCATION INFORMATION FOR CACHE ENTRY TRANSFER", and filed on Jul. 14, 2016, the entirety of which is incorporated by reference herein.

BACKGROUND

Description of the Related Art

To support execution of instructions at a processor, a processing system typically includes a memory subsystem including memory modules to store data to be accessed by the executing instructions. To facilitate processing efficiency, the memory subsystem can be organized into a memory hierarchy having main memory at the top of the hierarchy to store all data that can be accessed by the executing instructions, and one or more caches at lower levels of the memory hierarchy to store subsets of the data stored at main memory. For example, a processing system can include a memory hierarchy having at least two caches, a higher level cache (closer to main memory in the memory hierarchy) and a lower level cache (closer to a processor core of the processing system), wherein the lower level cache stores a subset of the higher level cache. Data that is transferred from the higher level cache to the lower level cache may later be transferred back to the higher level cache when, for example, the data is updated by the processing system or the data is evicted from the lower level cache to make room for incoming data. When the data is transferred back to the higher level cache, the processing system must determine the location in the higher level cache in which to place to data, thereby consuming power and memory access resources.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-5 illustrate techniques for improving memory management efficiency by storing, along with the data that is being transferred a higher level cache to a lower level cache, information indicating the higher-level cache location from which the data was transferred. To illustrate, upon receiving a request for data that is stored at location in higher level cache, a cache controller stores the higher level cache location information in a status tag of the data. The cache controller then transfers the data with the status tag indicating the higher level cache location to a lower level cache. When the data is subsequently updated or evicted from the lower level cache, the cache controller reads the status tag location information and transfers the data back to the location in the higher level cache from which it was originally transferred. By saving information indicating the location in the higher level cache from which the data was originally transferred, the processing system efficiently transfers the data back to the same location in the higher level cache. In particular, saving the location information data obviates the need to identify a location in the higher-level cache to store the data, thereby conserving power and memory access resources.

Figure 1:
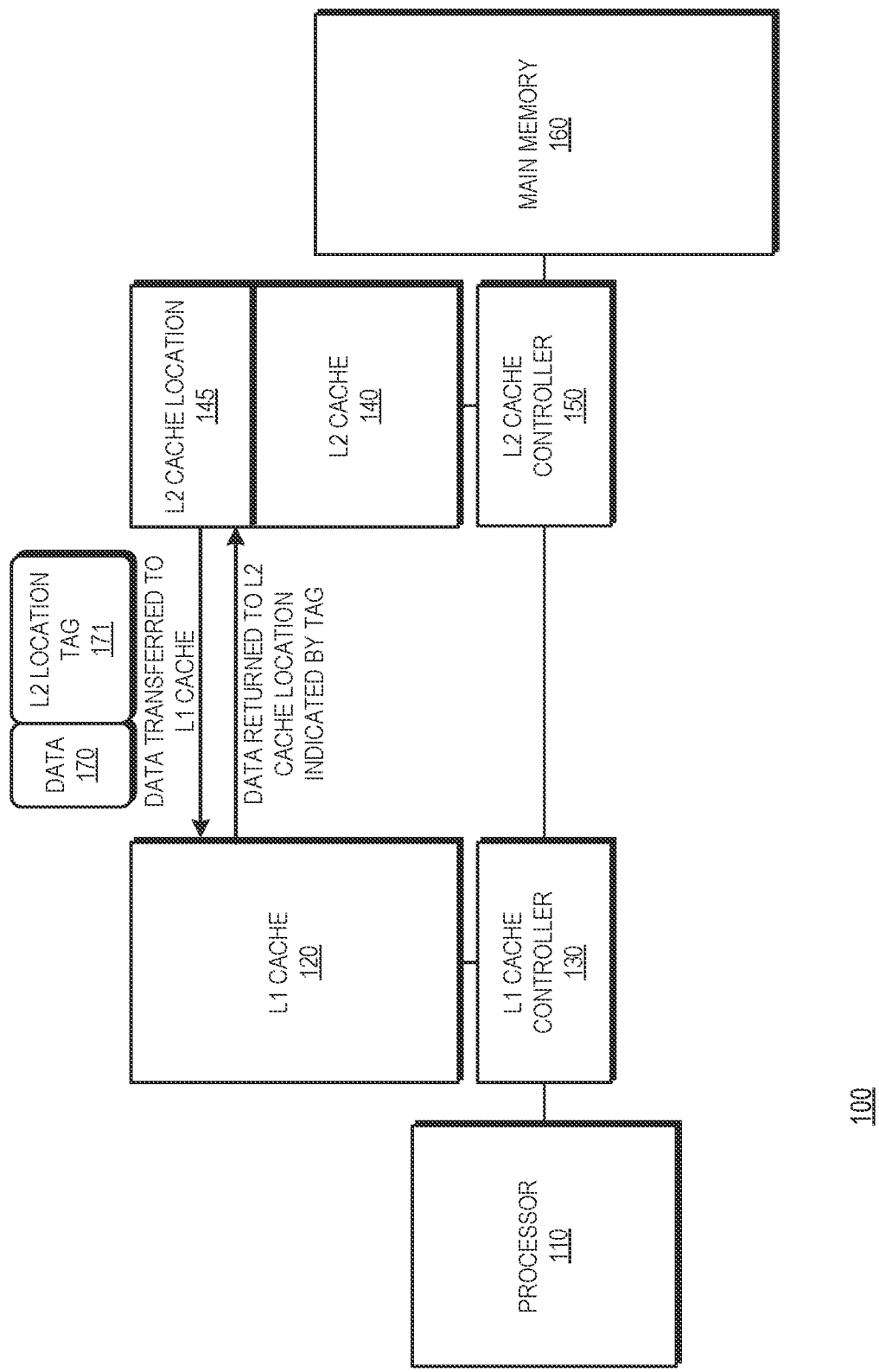
FIG. 1 is a block diagram of a processing system employing a cache management system in accordance with some embodiments.

FIG. 1 illustrates an example of a processing system 100 configured to transfer and store data with a location tag indicating the set and way in a cache from which the data was transferred. As such, the processing system 100 may be employed in any of a number of devices, such as a personal computer, workstation, mobile device such as a smartphone, a video game console, smart TV and the like. As described further herein, the processing system 100 includes a processor 110, an L1 cache 120, an L1 cache controller 130, an L2 cache 140, an L2 cache controller 150, and a main memory 160.

The processor 110 includes one or more instruction pipelines to execute instructions, organized in the form of computer programs, thereby carrying out tasks on behalf of an electronic device. While the processor 110 may have some amount of integral memory, for example, in the form of registers, such memory is typically limited in storage capacity. Accordingly, in order to execute instructions, the processor 110 stores and retrieves data from the memory hierarchy of the processing system 100, including the one or more levels of cache memory, such as L1 cache 120 and L2 cache 140, and main memory 160. In particular, in the course of executing instructions, the processor 110 generates operations, referred to as memory access requests, to store (a store operation) or load (a read operation) data from the memory hierarchy. The one or more levels of cache memory 120 and 140 and main memory 160 work together to satisfy the memory access requests, as described further herein. Although for purposes of illustration two levels of cache memory are depicted in FIG. 1, it will be appreciated that the processing system 100 may include more than two levels of cache memory.

The L1 cache 120 is a memory module configured to store data for access by the processor 110. In at least one embodiment, the L1 cache 120 includes a set of entries, each of which stores an associated unit of data, referred to as a cache line. Each cache line has an address in main memory that serves as an identifier for the data. In some embodiments, the L1 cache 120 is a set associative cache, wherein the cache is divided into a number of sets. Each set includes a number of entries, or ways, with each way corresponding to a cache entry that stores a cache line. Each set only stores cache lines associated with a subset of main memory addresses, wherein the subset associated with a set is identified by the corresponding cache controller based on a portion of the main memory address referred to as the index.

The L1 cache controller 130 is a module configured to receive memory access requests for data from the processor 110 and search the L1 cache 120 to determine if one of the cache entries stores a cache line associated with the memory address targeted by the memory access request. If the requested cache line is found in the L1 cache 120, a cache hit has occurred. In the event of a cache hit, the L1 cache controller 130 satisfies the memory access request by, in the case of a read operation, providing the requested cache line from the L1 cache 120 to the processor 110 or, in the case of a write operation, storing the write data to the cache entry.

Similar to the L1 cache 120, the L2 cache 140 is a memory that includes a set of entries, each of which stores an associated cache line. If a requested cache line is not found in the L1 cache 120, a cache miss has occurred. In the event of a cache miss at the L1 cache 120, the L1 cache controller 130 provides the memory access request to the L2 cache controller 150. The L2 cache controller 150 is a module configured to receive memory access requests from the L1 cache controller 130 in response to cache misses at the L1 cache 120. In response to receiving a memory access request, the L2 cache controller 150 identifies whether one of the cache entries of the L2 cache 140 stores data associated with the memory address targeted by the memory access request. If so, the L2 cache controller 150 identifies a cache hit, and provides the requested data from the L2 cache 140 to the L1 cache 120. If the requested data is not found in the L2 cache 140, the L2 cache controller 150 identifies a cache miss and provides the memory access request to the main memory 160. In response to the memory access request, the main memory 160 retrieves the cache line at the main memory address targeted by the request and provides the cache line to L2 cache 140.

If the requested cache line is found in the L2 cache 140 (either upon the original search by the L2 cache controller 150 or upon receipt from main memory 160 in response to a memory access request), the L2 cache controller 150 generates an L2 location tag 171 indicating the set and way of the L2 cache location 145. The L2 cache controller 150 then transfers the data 170 and the L2 location tag 171 from the L2 cache location 145 where it was found to the L1 cache 120. In some embodiments, the L2 cache 140 is configured to be inclusive of the L1 cache 120, such that the L2 cache 140 stores each of the cache lines stored in the L1 cache 120.

To facilitate more efficient transfer of data, the L1 cache controller 130 reads the L2 location tag 171 when transferring the data 170 back to the L2 cache 140. In the event a cache line in the L1 cache 120 is updated by a write operation from the processor 110, the updated cache line must be transferred to the L2 cache 140 so that the L2 cache 140 will remain inclusive of the L1 cache 120. When transferring the updated cache line to the L2 cache 140, the L1 cache controller 130 reads the L2 location tag 171 to determine the set and way of the L2 cache location 145 to which the cache line is to be transferred. Processing efficiency is improved by storing the L2 location tag 171 with the data 170, so that the data 170 is transferred back to the same L2 cache location 145 without requiring the L2 cache controller 150 to identify a location for the transferred data. By contrast, a conventional cache management system requires identifying a cache entry for the transferred data, such as looking up L2 cache set and way information for an entry to store the data, thereby consuming additional power and slowing access to the L2 cache 140.

In some embodiments, the L1 cache 120 is sized such that it cannot store, at a given time, all of the data that is has been transferred to it from the memory hierarchy and written to it by the processor 110. In the event that there is not an available cache entry in the L1 cache 120 to accommodate a cache line that is being written or transferred to the L1 cache 120, the L1 cache controller 130 will select a cache line from the L1 cache 120 for eviction to the L2 cache 140. When transferring the evicted cache line to the L2 cache 140, the L1 cache controller 130 reads the L2 location tag 171 to determine the set and way of the L2 cache location 145 to which the cache line is to be copied.

To illustrate, in operation, processor 110 executes a memory access operation. Processor 110 requests data 170 from the L1 cache controller 130, which searches the L1 cache 120 for the requested data 170. If the requested cache line is found in the L1 cache 120, the requested data 170 is provided to the processor 110. If the requested data 170 is not found in the L1 cache 120, the L1 cache controller 130 provides the memory access request to the L2 cache controller 150, which searches the L2 cache 140 for the requested data 170. If the requested data 170 is not found in the L2 cache 140, the L2 cache controller 150 provides the memory access request to main memory 160, which transfers the requested data 170 to the L2 cache 140.

If the requested data 170 is found in the L2 cache 140, the L2 cache controller 150 generates an L2 location tag 171 indicating the set and way of the L2 cache location 145 at which the requested data 170 was found in the L2 cache 140. The L2 cache controller 150 transfers the requested data 170 with the L2 location tag 171 to the L1 cache 120, where the memory access request is satisfied.

Subsequently, the data 170 is transferred from the L1 cache 120 back to the L2 cache 140. In some embodiments, the transfer is the result of the data 170 being updated at the L1 cache or is the result of the data 170 being evicted from the L1 cache 140 to make room for incoming data. At the time the data 170 is transferred back to the L2 cache 140, the L1 cache controller transfers the data 170 and the associated L2 location tag 171 to the set and way of the L2 cache location 145 as indicated by the L2 location tag 171. Transferring the data 170 back to the set and way of the L2 location 145 obviates the need for a lookup by the L2 cache controller 150, because the L2 location tag 171 that was stored with the data 170 in the L1 cache 120 contains the L2 cache 140 set and way information for the L2 cache location 145, thus facilitating more efficient cache management. In some embodiments, the processing system 100 is configured to store in a separate buffer (not shown at FIG. 1) a cache location tag indicating the set and way in the higher level cache from which the data was transferred, to be accessed when transferring the data back to the higher level cache.

Figure 2:
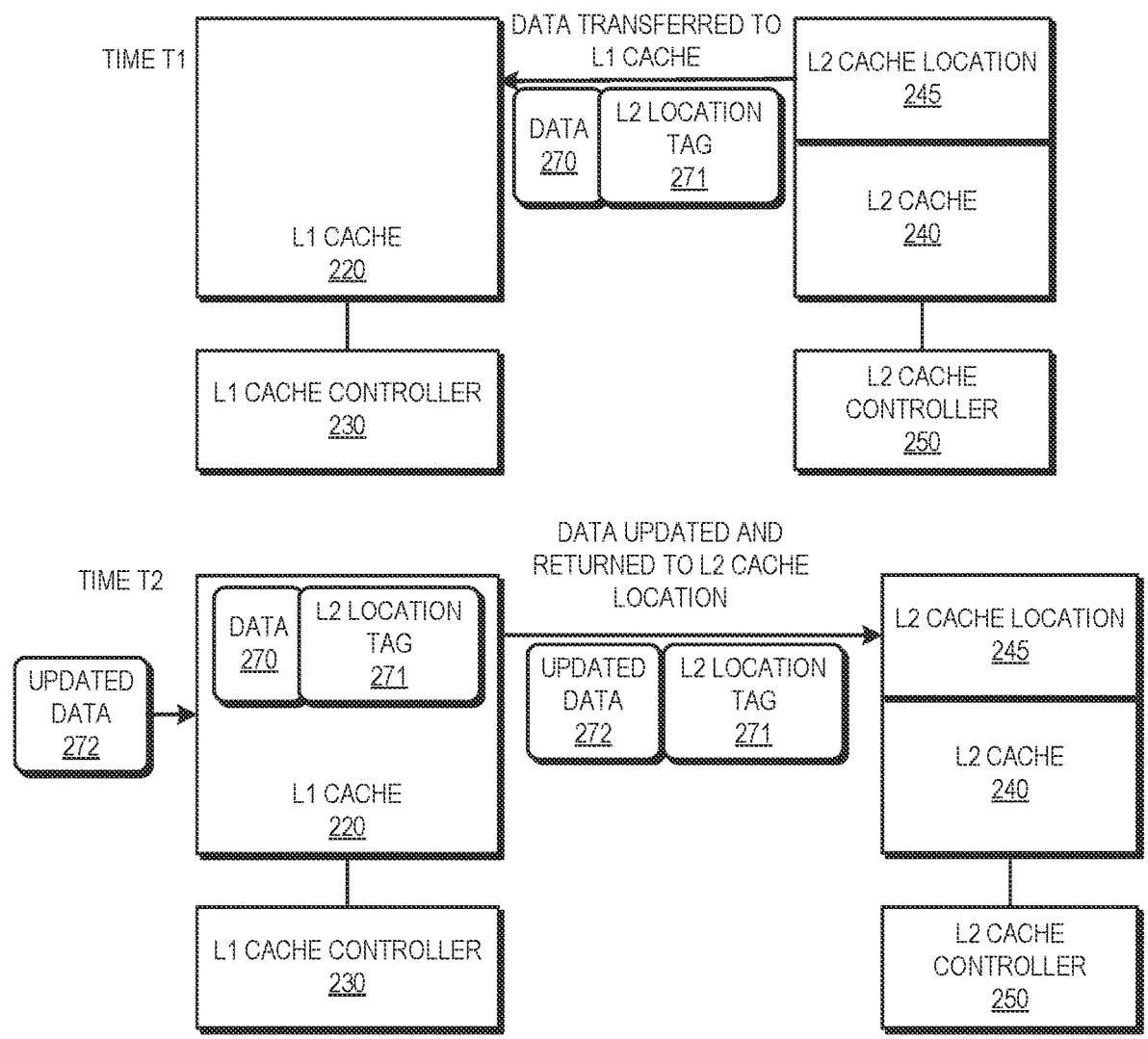
FIG. 2 is a block diagram of an example of the processing system of FIG. 1 transferring data and a location tag from a location in a higher level cache to a lower level cache, and subsequently transferring updated data and the location tag from the lower level cache to the location in the higher level cache in accordance with some embodiments.

FIG. 2 illustrates an example of the L2 cache controller 250 generating an L2 location tag 271 indicating the set and way of the L2 cache location 245 at which requested data 270 was stored in the L2 cache 240 and transferring the requested data 270 with the associated L2 location tag 271 to the L1 cache 220 at a time T1. Prior to time T1, the L1 cache controller 230 receives a request for data 270 from the processor (not shown), and searches the L1 cache 220 to determine if one of the L1 cache entries stores the cache line designated data 270 associated with the memory address targeted by the memory access request. In the example of FIG. 2, the requested data 270 is not present in the L1 cache 220, so the L1 cache controller 230 provides the memory access request to the L2 cache controller 250. In response to the memory access request, the L2 cache controller 250 searches the L2 cache 240 for the requested data 270 and finds the requested data 270 at the set and way of L2 cache location 245. The L2 cache controller 250 generates an L2 location tag 271 indicating the set and way of the L2 cache location 245 at which the requested data 270 was found. In some embodiments, the L2 location tag 271 is included in the status bits of the requested data 270 that indicates a memory coherence status for the data. For example, for an 8-way associative cache, the L2 cache way specified by the L2 location tag 271 will require three bits. In some embodiments, the three bits are repurposed from coherency status bits used to indicate whether the data stored at the entry is modified, exclusive to a given processor core, shared between processor cores, and the like. Once the L2 cache controller 250 has generated the L2 location tag 271 in response to the memory access request, the L2 cache controller 250 transfers the requested data 270 and the L2 location tag 271 to the L1 cache 220, where it is stored and available for use by the processor (not shown).

At a later time T2, the data 270 that has been transferred to and stored in the L1 cache 220 is updated by the processor (not shown). Upon receiving updated data 272 from the processor (not shown), the L1 cache controller 230 reads the L2 location tag 271 and transfers the updated data 272 to the set and way of the L2 cache location 245 as indicated by the L2 location tag 271. In this manner, the processing system maintains a copy of the updated data 272 in the L2 cache 240 without the need for performing a lookup to determine the set and way in the L2 cache 240 in which to place the updated data 272. It will be appreciated that, alternatively, at the later time T2, the data 270 that has been transferred to and stored in the L1 cache 220 may be transferred back to the L2 cache 240 without having been updated, for example, in the event that the data 270 is evicted from the L1 cache 220 to make room for an incoming cache line. In that event, the L1 cache controller 230 reads the L2 location tag 271 and transfers the data 270 to the set and way of the L2 cache location 245 as indicated by the L2 location tag 271.

Figure 3:
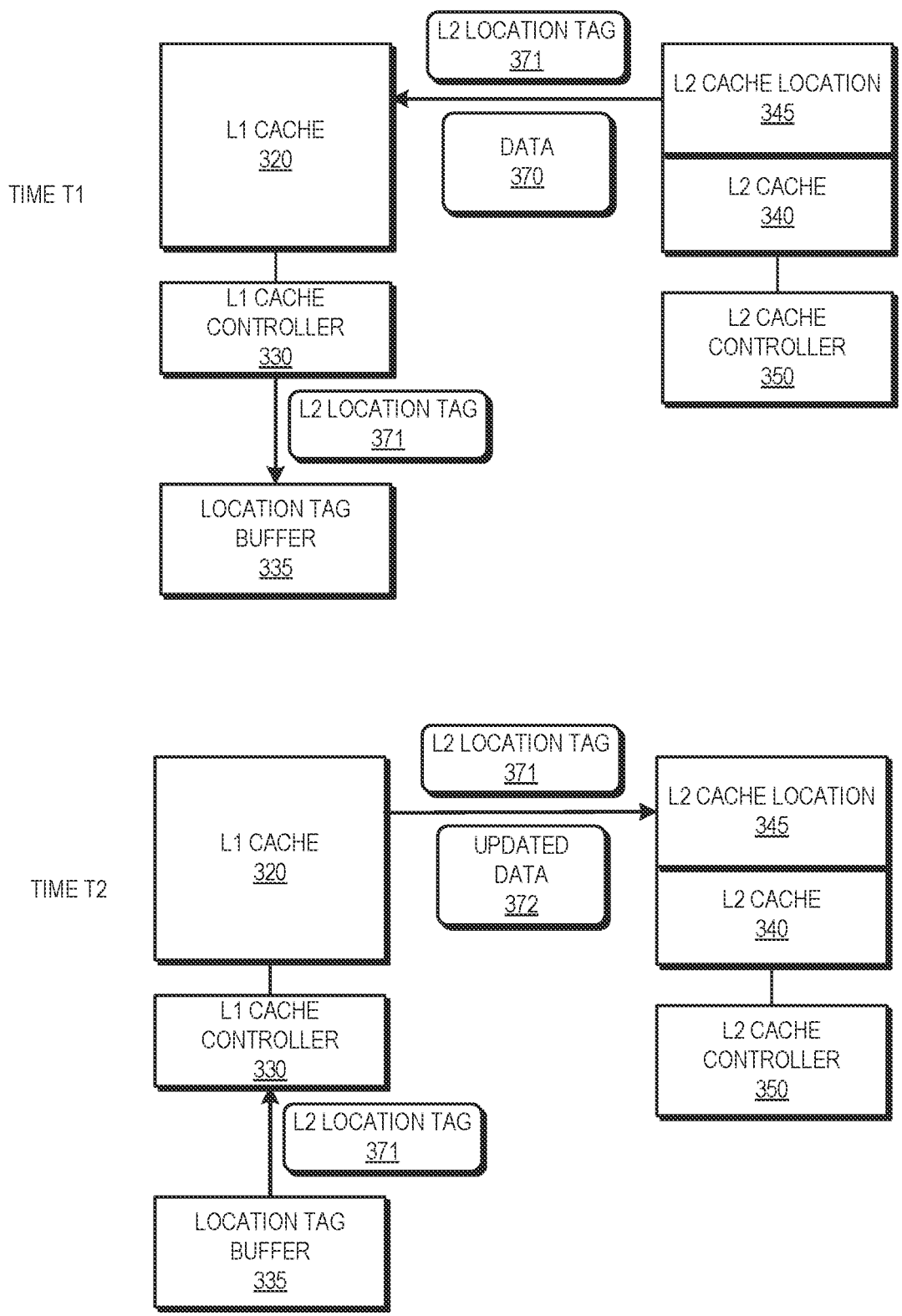
FIG. 3 is a block diagram of an example of the processing system of FIG. 1 transferring data from a higher level cache to a lower level cache and storing a location tag in a location tag buffer, and subsequently accessing the location tag from the location tag buffer when transferring updated data from the lower level cache to the location in the higher level cache in accordance with some embodiments.

FIG. 3 illustrates an example of the L2 cache controller 350 generating an L2 location tag 371 indicating the set and way of the L2 cache location 345 at which requested data 370 was stored in the L2 cache 340 and transferring the requested data 370 with the associated L2 location tag 371 to the L1 cache 320 at a time T1. Prior to time T1, the L1 cache controller 330 receives a request for data 370 from the processor (not shown), and searches the L1 cache 320 to determine if one of the L1 cache entries stores the cache line designated data 370 associated with the memory address targeted by the memory access request. In the example of FIG. 3, the requested data 370 is not present in the L1 cache 320, so the L1 cache controller 330 provides the memory access request to the L2 cache controller 350. In response to the memory access request, the L2 cache controller 350 searches the L2 cache 340 for the requested data 370 and finds the requested data 370 at the set and way of L2 cache location 345. The L2 cache controller 350 generates an L2 location tag 371 indicating the set and way of the L2 cache location 345 at which the requested data 370 was found, and transfers the requested data 370 and the L2 location tag 371 to the L1 cache 320. In the example of FIG. 3, the L1 cache controller 330 stores the L2 location tag 371 in a location tag buffer 335.

In the example of FIG. 3, at a later time T2, the data 370 that has been transferred to and stored in the L1 cache 320 is updated by the processor (not shown). Upon receiving updated data 372 from the processor (not shown), the L1 cache controller 330 accesses the location tag buffer 335 and reads the L2 location tag 371 stored in the location tag buffer 335. The L1 cache controller 330 then transfers the updated data 372 to the set and way of the L2 cache location 345 as indicated by the L2 location tag 371. In this manner, the processing system maintains a copy of the updated data 372 in the L2 cache 340 without the need for performing a lookup to determine the set and way in the L2 cache 340 in which to place the updated data 372. It will be appreciated that, alternatively, at the later time T2, the data 370 that has been transferred to and stored in the L1 cache 320 may be transferred back to the L2 cache 340 without having been updated, for example, in the event that the data 370 is evicted from the L1 cache 320 to make room for an incoming cache line. In that event, the L1 cache controller 330 accesses the location tag buffer 335, from which it reads the L2 location tag 371, and transfers the data 370 to the set and way of the L2 cache location 345 as indicated by the L2 location tag 371.

Figure 4:
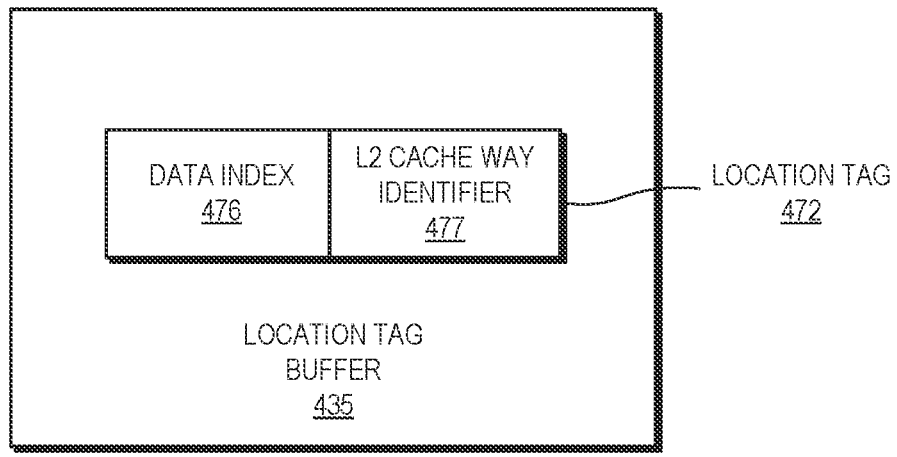
FIG. 4 is a block diagram of an example of a location tag stored in a location tag buffer in accordance with some embodiments.

FIG. 4 illustrates an example of a location tag 472 stored in a location tag buffer 435. The location tag 472 includes a data index 476 associated with the data (not shown) and the L2 cache way identifier 477. The set associativity of the L2 cache (not shown) determines which set of the L2 cache is configured to store data having data index 476. The L2 cache way identifier 477 indicates the cache way within the set associated with the data index 476 from which the data (not shown) was previously transferred from the L2 cache (not shown). Therefore, the combination of the data index 476 and L2 cache way identifier 477 of the location tag 472 identifies the set and way within the L2 cache (not shown) that stored the data (not shown) before it was transferred to the L1 cache (not shown). In the example of FIG. 4, the location tag 472 is stored in the location tag buffer 435.

Figure 5:
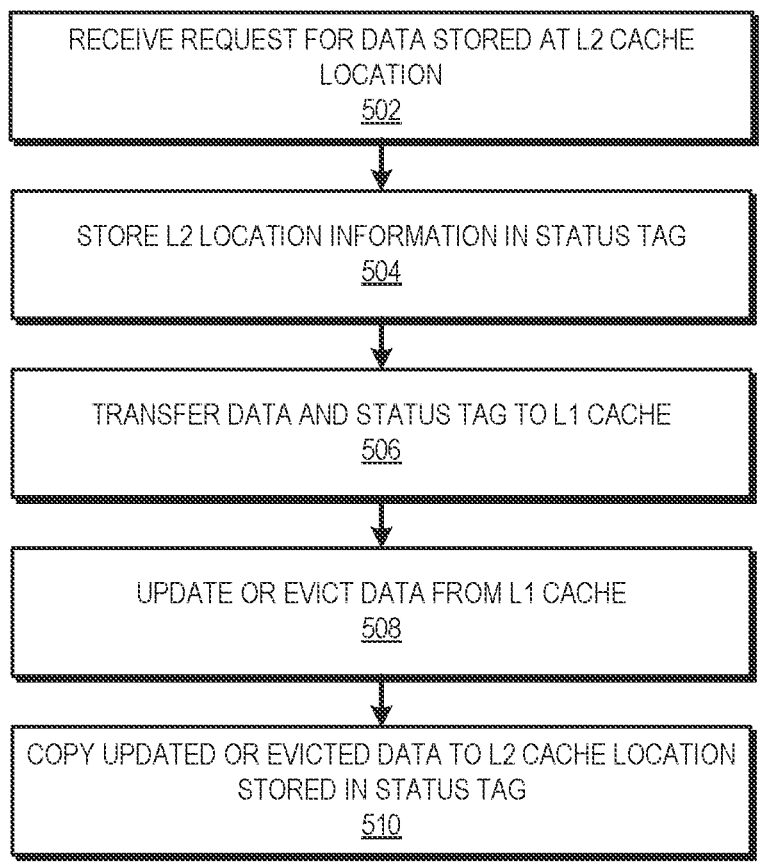
FIG. 5 is a flow chart of a method of storing, at a cache, cache location information for a different cache, such that the location information can be accessed when the data is transferred back to the different cache in accordance with some embodiments.

FIG. 5 illustrates a method 500 by which the processing system 100 of FIG. 1 stores L2 set and way location information with data transferred to an L1 cache such that the location information is accessed when the data is copied back or evicted to the L2 cache location in accordance with some embodiments. At step 502, the L2 cache controller 150 receives a request for data 170 that is stored at an L2 cache location 145. At step 504, the L2 cache controller 150 stores L2 location information 145 in an L2 location tag 171 of the requested data 170. At step 506, the L2 cache controller 150 transfers the requested data 170 and L2 location tag 171 to the L1 cache 120, where it is stored. At step 508, the data 170 is updated or evicted from the L1 cache 120. At step 510, the L1 cache controller 130 transfers the updated or evicted data 170 to the L2 cache location 145 stored in the L2 location tag 171.

A computer readable storage medium may include any storage medium, or combination of storage media, accessible by a computer system during use to provide instructions and/or data to the computer system. Such storage media includes, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
  responsive to determining that data is to be evicted from a first cache, transferring the data from the first cache to a way of a second cache indicated by location information stored with the data, wherein the location information is stored prior to determining that the data is to be evicted from the first cache and identifies the second cache as a higher level cache from which the data was previously transferred.

2. The method of claim 1, wherein the data is stored at the way of the second cache indicated by the location information prior to the data being stored at the first cache.

3. The method of claim 2, further comprising:
  prior to determining that the data is to be evicted from the first cache, transferring the data from the way of the second cache to the first cache; and
  storing, in a portion of bits of the data at the first cache, the location information indicating the way of the second cache.

4. The method of claim 3, wherein storing the location information comprises:
  generating a location tag that includes the location information indicating the way of the second cache.

5. The method of claim 4, wherein generating the location tag comprises modifying status bits of the data to include the location tag, wherein the status bits indicate a memory coherence status of the data.

6. The method of claim 4, wherein storing the location information comprises:
  storing the location tag in a location tag buffer; and
  storing the location tag with the data at the first cache.

7. The method of claim 1, wherein the second cache is inclusive of the first cache.

8. The method of claim 1, wherein the transferring further comprises transferring the location information indicating the way of the second cache.

9. A method, comprising:
  responsive to determining that data is to be evicted from a first cache, transferring the data to an entry of a second cache indicated by a location tag that is stored at the first cache prior to determining that the data is to be evicted from the first cache and identifies the second cache as a higher level cache from which the data was previously transferred.

10. The method of claim 9, further comprising:
  before determining that the data is to be evicted from the first cache, transferring the data to the first cache; and
  storing, in the first cache, the location tag with the data.

11. The method of claim 10, further comprising:
  before transferring the data from the second cache to the first cache, generating, in response to a memory access request for the data located in the second cache, the location tag indicating the entry of the second cache that stores the data.

12. The method of claim 11, wherein generating the location tag comprises:
  storing the location tag in a portion of bits of the data, wherein the location tag indicates a set and way of the entry of the second cache.

13. The method of claim 12, wherein generating the location tag comprises modifying a status tag indicating a memory coherence status of the data to include the location tag.

14. The method of claim 9, wherein the second cache is inclusive of the first cache.

15. A device, comprising:
  a first cache;
  a second cache; and
  a cache controller, associated with the second cache, the cache controller configured to:
    responsive to a determination that data is to be evicted from the first cache, transfer the data from the first cache to an entry of the second cache indicated by location information stored at the first cache prior to the determination that the data is to be evicted from the first cache and identifying the second cache as a higher level cache from which the data was previously transferred.

16. The device of claim 15, wherein the cache controller is further configured to:
  prior to the determination that the data is to be evicted from the first cache, transfer the data from the entry in the second cache to the first cache.

17. The device of claim 15, wherein the cache controller is further configured to:
  store the location information in a location tag buffer.

18. The device of claim 15, wherein the cache controller is further configured to:
  store the location information in a subset of bits of the data.

19. The device of claim 15, wherein the cache controller is further configured to:
 store the location information in a subset of status bits of the data, wherein the status bits indicate a coherency status of the data.

\* \* \* \* \*